United States Patent
Kim et al.

(10) Patent No.: US 8,237,802 B2
(45) Date of Patent: Aug. 7, 2012

(54) METHOD AND APPARATUS FOR DETERMINING SHAKEN IMAGE BY USING AUTO FOCUSING

(75) Inventors: Hye-jin Kim, Suwon-si (KR); Hyun-sik Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 12/859,543

(22) Filed: Aug. 19, 2010

(65) Prior Publication Data

US 2011/0043647 A1    Feb. 24, 2011

(30) Foreign Application Priority Data

Aug. 24, 2009    (KR) .................. 10-2009-0078172

(51) Int. Cl.
*H04N 5/228*    (2006.01)
*G03B 13/00*    (2006.01)
*G03B 17/00*    (2006.01)
*G03B 19/12*    (2006.01)

(52) U.S. Cl. ............... 348/208.1; 348/349; 348/352; 396/52; 396/358

(58) Field of Classification Search .. 348/208.1–208.16, 348/349, 352; 396/52–55, 358
See application file for complete search history.

(56) References Cited

U.S. PATENT DOCUMENTS

| | | | | |
|---|---|---|---|---|
| 2006/0098891 | A1* | 5/2006 | Steinberg et al. | 382/255 |
| 2006/0239672 | A1* | 10/2006 | Yost et al. | 396/125 |
| 2007/0242142 | A1* | 10/2007 | Okazaki | 348/239 |
| 2011/0063494 | A1* | 3/2011 | Chou et al. | 348/349 |

* cited by examiner

*Primary Examiner* — Lin Ye
*Assistant Examiner* — Mekonnen Dagnew
(74) *Attorney, Agent, or Firm* — Drinker Biddle & Reath LLP (57) ABSTRACT

A method and apparatus for determining a shaken image by using auto focusing. The method includes calculating a maximum AF value of a preview image and a maximum AF value of a captured image that is down-sampled according to the preview image and comparing the maximum AF value of the preview with the maximum AF value of the captured image to determine whether the captured image is shaken or not.

23 Claims, 5 Drawing Sheets

METHOD AND APPARATUS FOR DETERMINING SHAKEN IMAGE BY USING AUTO FOCUSING

CROSS-REFERENCE TO RELATED PATENT APPLICATION

This application claims the benefit of Korean Patent Application No. 10-2009-0078172, filed on Aug. 24, 2009, in the Korean Intellectual Property Office, the entire contents of which is incorporated herein by reference.

BACKGROUND OF THE INVENTION

1. Field of the Invention

The present invention relates to an image processing, and more particularly, to a method and apparatus for determining whether an image is a shaken image by using auto focusing.

2. Description of the Related Art

In general, an optical digital system (camera) uses an auto focusing (AF) function to automatically adjust a focus on a certain subject. In addition, most compact digital cameras use through the lens (TTL) contrast detection to precisely fine tune and define a subject. Such compact digital cameras do not have a separate AF sensor, and adjust focus by analyzing the contrast of an image obtained via a charge coupled device (CCD)/complementary metal oxide semiconductor (CMOS) image sensor.

A conventional method of adjusting focus of a photographing lens of a digital camera includes generating an image signal by photoelectric-transformation of an image of a subject using an image pickup device such as a CCD, calculating an AF evaluation value, which is a contrast value of an image, by extracting a high frequency component from an image signal in a predetermined AF area of a captured image, and detecting a focus location of the photographing lens based on the AF evaluation value. According to this method, the AF evaluation value is calculated from each focus location of a focus lens while moving the focus lens along an optical axis direction, and a location having the maximum AF evaluation value is detected as the focus location. The AF evaluation value is obtained by filtering a brightness component using a high pass filter (HPF) and integrating the obtained result.

Meanwhile, users select high quality images from a lot of images stored in a digital camera, check the selected images, and upload the selected images to web servers. Users also delete low quality images, e.g., shaken images, when searching for images using a playback device or a computer.

Shaken images may be generated due to various reasons such as motion of a subject when an image of the subject is captured, long exposure time at night or indoor photographing, hand tremble of a user when pressing a shutter button, or motion of the digital camera. Thus, it is not easy to individually select shaken images from among many images stored in the digital camera and delete them.

SUMMARY OF THE INVENTION

The present invention provides a method and apparatus for determining a shaken image due to hand tremble, movement of photographing subject, or the like by using auto focusing (AF) when photographing or reproducing images.

According to an aspect of the present invention, there is provided a method of determining a shaken image using auto focusing (AF), the method including: calculating a first maximum AF value by performing AF on a preview image and storing the calculated AF value; sampling a captured image according to a resolution of the preview image; calculating a second maximum AF value by performing AF on the sampled captured image; comparing the stored first maximum AF value with the second maximum AF value; and determining whether the captured image is shaken or not based on a comparison result.

The determining may be performed by determining whether a difference between the first maximum AF value and the second maximum AF value is greater than a predetermined threshold value.

The method may further include displaying a message if the captured image is a shaken image.

The method may further include deleting the captured image according to a selection of a user, if the captured image is a shaken image.

The method may further include storing the captured image in a first folder if the difference between the first maximum AF value and the second maximum AF value is smaller than the threshold value, and storing the captured image in a second folder if the difference between the first maximum AF value and the second maximum AF value is greater than the threshold value.

The method may further include deleting the captured images stored in the second folder according to a selection of the user.

The method may further include storing the calculated second maximum AF value within the captured image.

The second maximum AF value may be stored in an exchangeable image file (EXIF) of the captured image.

It is determined whether the captured image is shaken or not by using the stored second maximum AF value when the captured image is reproduced.

An icon indicating that the image is shaken may be displayed while the captured image is reproduced.

According to another aspect of the present invention, there is provided an apparatus for determining a shaken image, the apparatus including: an image signal processor sampling a captured image according to a resolution of a preview image; an auto focusing (AF) module calculating a first maximum AF value by performing AF on the preview and a second maximum AF value by performing AF on the sampled captured image; and a controller comparing the first maximum AF value with the second maximum AF value and determining whether the captured image is shaken or not based on a comparison result.

The apparatus may further include a storage unit storing the first maximum AF value.

The controller may determine whether the captured image is shaken if a difference between the first maximum AF value and the second maximum AF value is greater than a predetermined threshold value.

The controller may output a signal if the captured image is shaken.

The controller may delete the captured image according to a selection of a user if the captured image is shaken.

The controller may store the captured image in a first folder if the difference between the first maximum AF value and the second maximum AF value is smaller than the threshold value, and stores the captured image in a second folder if the difference between the first maximum AF value and the second maximum AF value is greater than the threshold value.

The controller may store the calculated second maximum AF value within the captured image.

The controller may store the second maximum AF value in an exchangeable image file (EXIF) of the captured image.

The controller may determine whether the captured image is shaken or not by using the stored second maximum AF value when the captured image is reproduced.

According to another aspect of the present invention, there is provided a method of determining whether an image is shaken using auto focusing (AF). The method including calculating a first AF value of a preview image obtained at a focus lens location and storing the calculated first AF value; calculating a second AF value of a captured image obtained at the focus lens location; comparing the stored first AF value with the second AF value; and determining whether the captured image is shaken or not based on a comparison result.

Calculating a first AF value may include calculating a first AF value of a preview image obtained at a focus lens location and storing the calculated first AF value, wherein the focus lens location is obtained by performing auto focus in response to receiving a user command.

Calculating a second AF value may include downsizing a captured image obtained at the focus lens location to a resolution of the preview image; and calculating a second AF value of the captured image.

According to another aspect of the present invention, there is provided a computer readable recording medium having recorded thereon a program for executing the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Therefore there is a need in the art for an apparatus for and a method of determining a shaken image using auto focusing (AF). The method including calculating a first maximum AF value by performing AF on a preview image and storing the calculated AF value; sampling a captured image according to a resolution of the preview image; calculating a second maximum AF value by performing AF on the sampled captured image; comparing the stored first maximum AF value with the second maximum AF value; and determining whether the captured image is shaken or not based on a comparison result.

Hereinafter, the present invention will be described more fully with reference to the accompanying drawings, in which exemplary embodiments of the invention are shown. Detailed descriptions about well-known functions or configurations to one of ordinary skill in the art are omitted.

Unless defined otherwise, technical and scientific terms used herein have the same meanings as commonly understood by one of ordinary skill in the art to which the present invention belongs.

Figure 1:
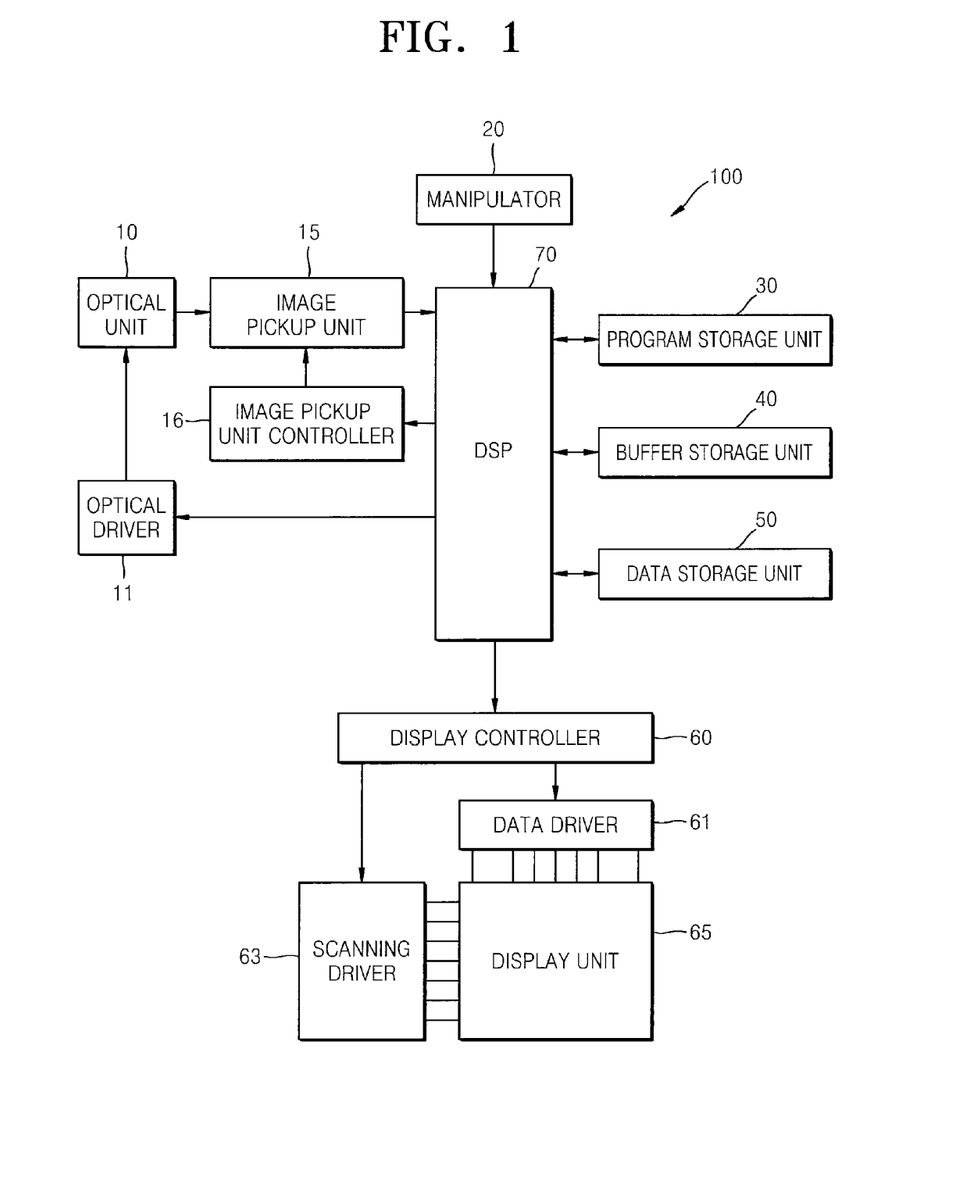
FIG. 1 is a block diagram schematically illustrating an example of a digital photographing apparatus.
Figure 2:
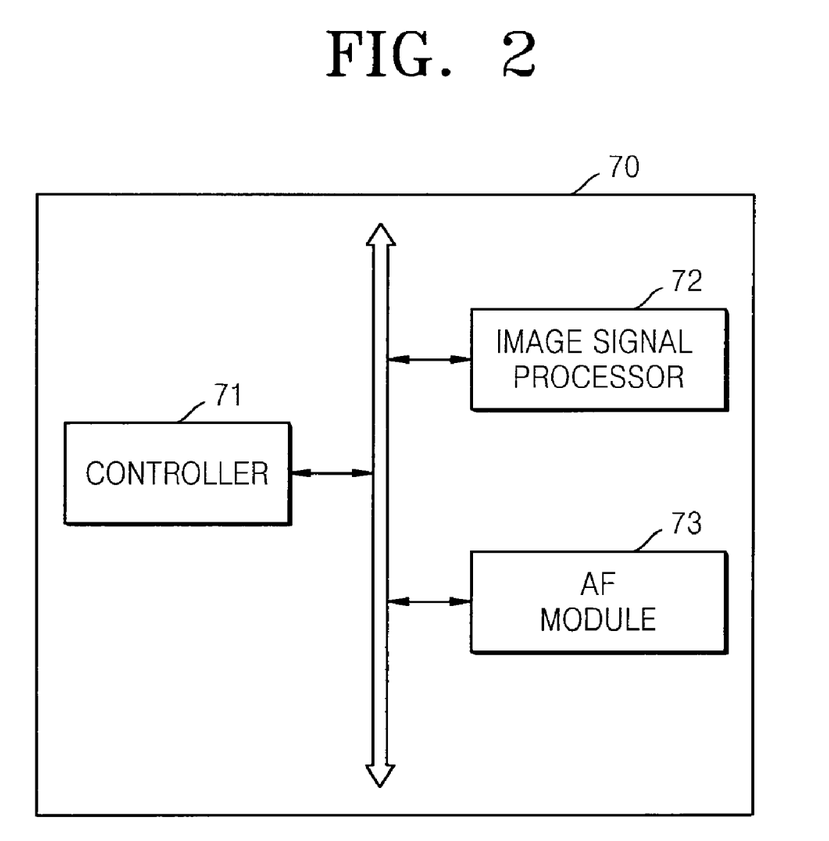
FIG. 2 is a block diagram of a digital signal processor illustrated in FIG. 1.

FIG. 1 is a block diagram schematically illustrating an example of a digital camera 100, which is an example of a digital photographing apparatus. FIG. 2 is a block diagram of an example of a digital signal processor 70 illustrated in FIG. 1.

Referring to FIG. 1, the digital camera 100 includes an optical unit 10, an optical driver 11, an image pickup device 15, an image pickup device controller 16, a manipulator 20, a program storage unit 30, a buffer storage unit 40, a data storage unit 50, a display controller 60, a data driver 61, a scanning driver 63, a display unit 65, and a digital signal processor (DSP) 70.

The optical unit 10 receives an optical signal from a subject to be photographed, and transmits the optical signal to the image pickup device 15. The optical unit 10 may include at least one of a zoom lens, which narrows or widens a view angle according to a focal length, and a focus lens, which adjusts focus on the subject. Also, the optical unit 10 may further include an iris which adjusts light intensity.

The optical driver 11 adjusts a location of the lens or opening/closing of the iris. Focus is adjusted by moving the location of the lens, and light intensity is adjusted by closing/opening the iris. The optical driver 11 controls the optical unit 10 according to a control signal that is automatically generated according to an image signal received in real time or a control signal that is input by a user.

In response to the optical signal received by the optical unit 10, an image of the subject is formed on a light receiving surface of the image pickup device 15. The image pickup device 15 is a photoelectric transformation device that converts the optical signal into an electric signal, and may be a charge coupled device (CCD) or a complementary metal oxide semiconductor image sensor (CIS). The sensitivity or the like of the image pickup device 15 may be adjusted by the image pickup device controller 16. The image pickup device controller 16 controls the image pickup device 15 according to a control signal that is automatically generated by an image signal received in real time, or a control signal that is input by the user.

The manipulator 20 may receive a control signal from an external source, such as from the user. The manipulator 20 may include a shutter-release button for receiving a shutter-release signal for capturing an image by exposing the image pickup unit 15 to light for a predetermined time, a power supply button for supplying power, a pantoscopic-zoom button and telescopic-zoom button for widening or narrowing a view angle according to an input signal, and various functional buttons for inputting characters, selecting a mode, such as a photographing mode and a reproducing mode, selecting a white balance setting function or an exposure setting function. The structure of the manipulator 20 is not limited as long as the manipulator 20 is able to receive a signal input by the user. Examples of the manipulator 20 include a keyboard, a touch pad, a touch screen, and a remote controller. In addition, the user may select the reproducing mode, or a shaken image-detecting mode using the manipulator 20.

The digital camera 100 includes the program storage unit 30, which stores programs such as an operating system for driving the digital camera 100 and an application system, the buffer storage unit 40, which temporarily stores data required to perform operations or result data, and the data storage unit 50, which stores various types of information required by the program and an image file including an image signal.

Moreover, the digital camera 100 includes the display controller 60, which controls the display unit 65 to display an operating status of the digital camera 100 or information of an image photographed by the digital camera 100, the data driver 61 and the scanning driver 63, which transmit display data received from the display controller 60, and the display unit 65, which displays a predetermined image according to a signal received from the data driver 61 and the scanning driver 63. The display unit 65 may be a liquid crystal display panel (LCD), an organic light emitting display panel (OLED), or an electrophoretic display panel (EPD). In addition, the display unit 65 displays AF windows for the subject and the background in a live view screen. The display unit 65 also displays a message that AF has been successful or not based on the results of AF.

The digital camera 100 also includes the DSP 70, which processes a received image signal and controls each element according to the received image signal or an external input signal.

The an example of the DSP 70 will be described with reference to FIG. 2.

Referring to FIG. 2, the DSP 70 includes a controller 71, an image signal processor 72, and an AF module 73. The DSP 70 is an apparatus for determining a shaken image.

The controller 71 controls overall operations of the DSP 70.

The controller 71 controls the image signal processor 72 to down-sample a captured image according to the resolution of a preview image. Down-sample may include lowering the resolution of the captured image to match the resolution of the preview image. The controller also controls the AF module 73 to auto focus the preview image received from the image pickup device 15 and the captured image.

The AF module 73 performs AF on the input preview image to calculate a maximum AF value (first maximum AF value) and AF on the captured image to calculate a maximum AF value (second maximum AF value). The first maximum AF value is an AF evaluation value calculated at a focus lens location obtained by performing AF on the preview image when the user half presses a shutter button (S1). The second maximum AF value may be an AF evaluation value obtained by down-sampling the image captured when the user fully presses the shutter button (S2) according to the resolution of the preview image and performing AF on the down-sampled captured image.

The controller 71 compares the first maximum AF value with the second maximum AF value, which are calculated by the AF module 73, and determines whether the captured image is shaken or not based on the comparison result. That is, if the first maximum AF value and the second maximum AF value are approximately equal to each other, it is determined that the captured image is not shaken. If the first maximum AF value and the second maximum AF value are different from each other, it is determined that the captured image is shaken. A value for determining whether the image is shaken may be the difference between the first and second maximum AF values. In an example embodiment, if the difference between the first and second maximum AF values is greater than a predetermined threshold value, it is be determined that the captured image is shaken. On the other hand, if the difference between the first and second maximum AF values is less than the threshold value, it is determined that the captured image is not shaken. The threshold value may be determined based on comparisons of images that are considered by users to be shaken and images that are considered by users to be not shaken.

The controller 71 controls the data storage unit 50 to store the first maximum AF value calculated by the AF module 73. Thus, a shaken image is detected by comparing the AF value of the captured value with the first maximum AF value after photographing is performed, or comparing the AF value of the image which is extracted while reproducing the image with the first maximum AF value. The controller 71 stores the second maximum AF value of the captured image with the captured image when the captured image is compressed and recorded. In this regard, the second maximum AF value of the captured image and the captured image may be stored in an exchangeable image file (EXIF) of the captured image.

In addition, if the captured image is shaken, the controller 71 informs the user or deletes the captured image according to the selection of the user. In addition, the images are classified into shaken images or unshaken images using the method described above and stored in different folders.

The image signal processor 72 samples the image captured according to the controller 71 so as to correspond to the resolution of the preview image. In this regard, the AF on the captured image is performed using RAW data obtained from the image pickup device 15, e.g., CCD. However, the AF on the preview image is performed using data sampled from the RAW data. Thus, the captured image is down-sampled according to the resolution of the sampled preview image before performing AF on the captured image, and AF on the captured image is performed. In this regard, the sampling method may vary according to the types of the image pickup device.

The image signal processor 72 converts an image signal received from the image pickup device 15 into a digital signal, and performs image signal processes such as gamma correction, color filter array interpolation, color matrix transformation, color correction, and color enhancement, so as to convert the image signal as desired by the user. The image signal processor 72 may also perform an auto white balance or auto exposure algorithm. Also, the image signal processor 72 adjusts a size of image data using a scaler, and generates an image file having a predetermined format by compressing the image data. Alternatively, the image signal processor 72 may decompress an image file. The image signal processor 72 performs the image signal processes as described above on an image signal that is input in real time in a preview mode before taking a photograph, or on an image signal that is input in response to a shutter-release signal. Also, different image signal processes may be performed on each image signal.

The AF module 73 performs AF on the preview image and the captured image down-sampled according to the size and the resolution of the preview image according to control of the controller 71. That is, in order to determine whether the captured image is shaken or not, the maximum AF value of the preview determined while performing the AF operation is compared with the maximum AF value obtained by down-sampling the captured image and performing AF on the down-sampled captured image. In another example of the AF module 73, the AF module 73 performs AF on the captured image without down-sampling the captured image.

An example of the AF operation will be described in more detail. An AF area is selected in the preview image of the captured image. The AF area is fixed by locating a square window on a subject to be photographed by the user. Each image signal of all frames constituting the preview image passes through a high pass filter (HPF) that extracts edge images. In this regard, all frames indicate image frames constituting the preview image. For example the preview image may include 10 frames. In addition, high frequency components of the image signal of each frame are extracted when the image signals pass through the HPF. Since focused images have high sensitivity and thus have a lot of high frequency components, the high frequency components of the image signal are extracted, and the amount of edge data off all edge images is summed. That is, the extracted high frequency components are integrated. A location of the focus lens is determined so as to correspond to an AF value of the frame in which the amount of the integrated data is the greatest. That is, the AF process is performed by selecting the AF value of the frame having the maximum amount of edge information, determining the location of the focus lens at which the AF value is the greatest as focus, and moving the focus lens into the location. The process of determining the focus lens is performed by sequentially moving the focus lens (not shown) to obtain the AF value and locating the focus lens at a location in which the AF value is the greatest. The high frequency component of the image signal is maximized at the focus, and thus the focus lens is controlled to be at a location having the maximum AF value.

Figure 3:
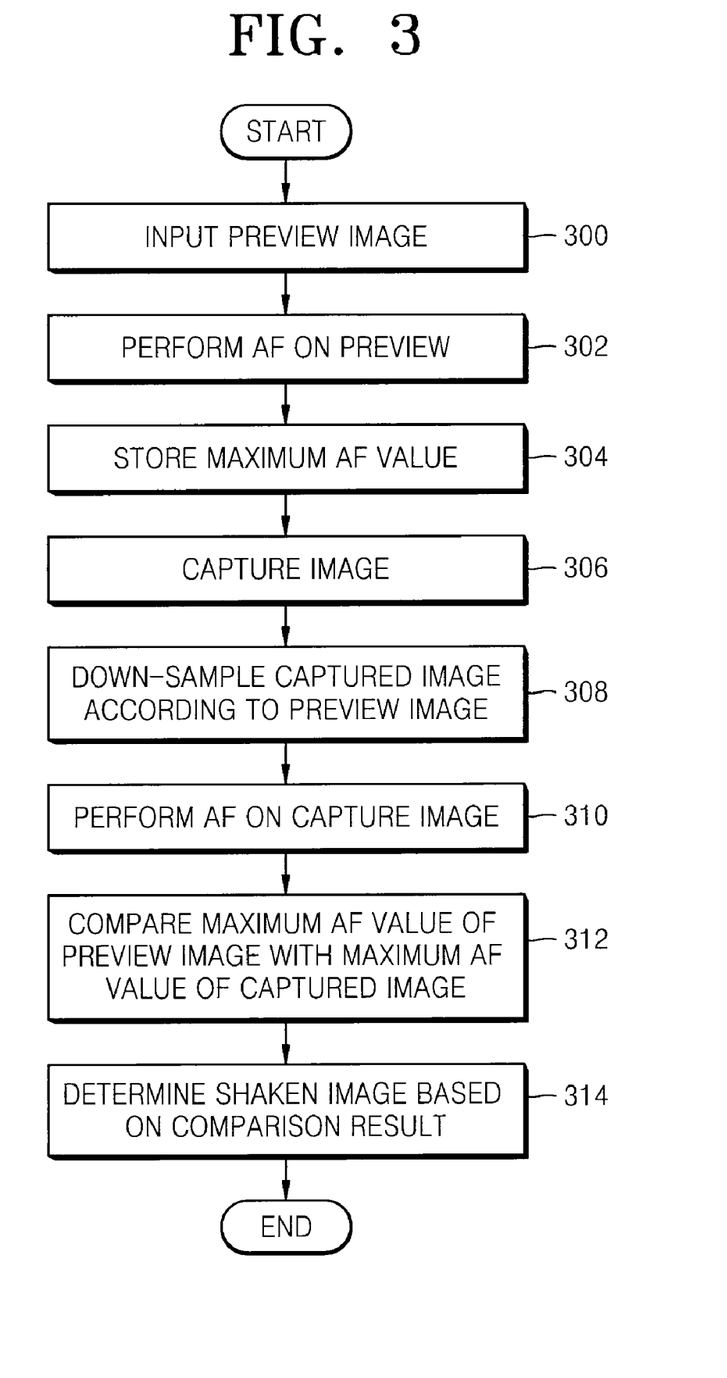
FIG. 3 is a flowchart illustrating an example of a method of determining whether an image is a shaken image using auto focusing (AF)

FIG. 3 is a flowchart illustrating an example of a method of determining a shaken image using AF.

Referring to FIG. 3, a preview image is input in operation 300. In operation 302, AF on the preview image is performed when a user half presses the shutter button S1 to calculate the maximum AF value. In operation 304, the maximum AF value of the preview image calculated in operation 302 is stored. In operation 306, an image is captured when the user fully presses the shutter button S2. In operation 308, the captured image is down-sampled according to the preview image. In operation 310, AF is performed on the down-sampled captured image to calculate the maximum AF value. In operation 312, the maximum AF value of the preview image is compared with the maximum AF value of the captured image. In operation 314, it is determined whether the captured image is shaken or not based on the comparison result.

Figure 4:
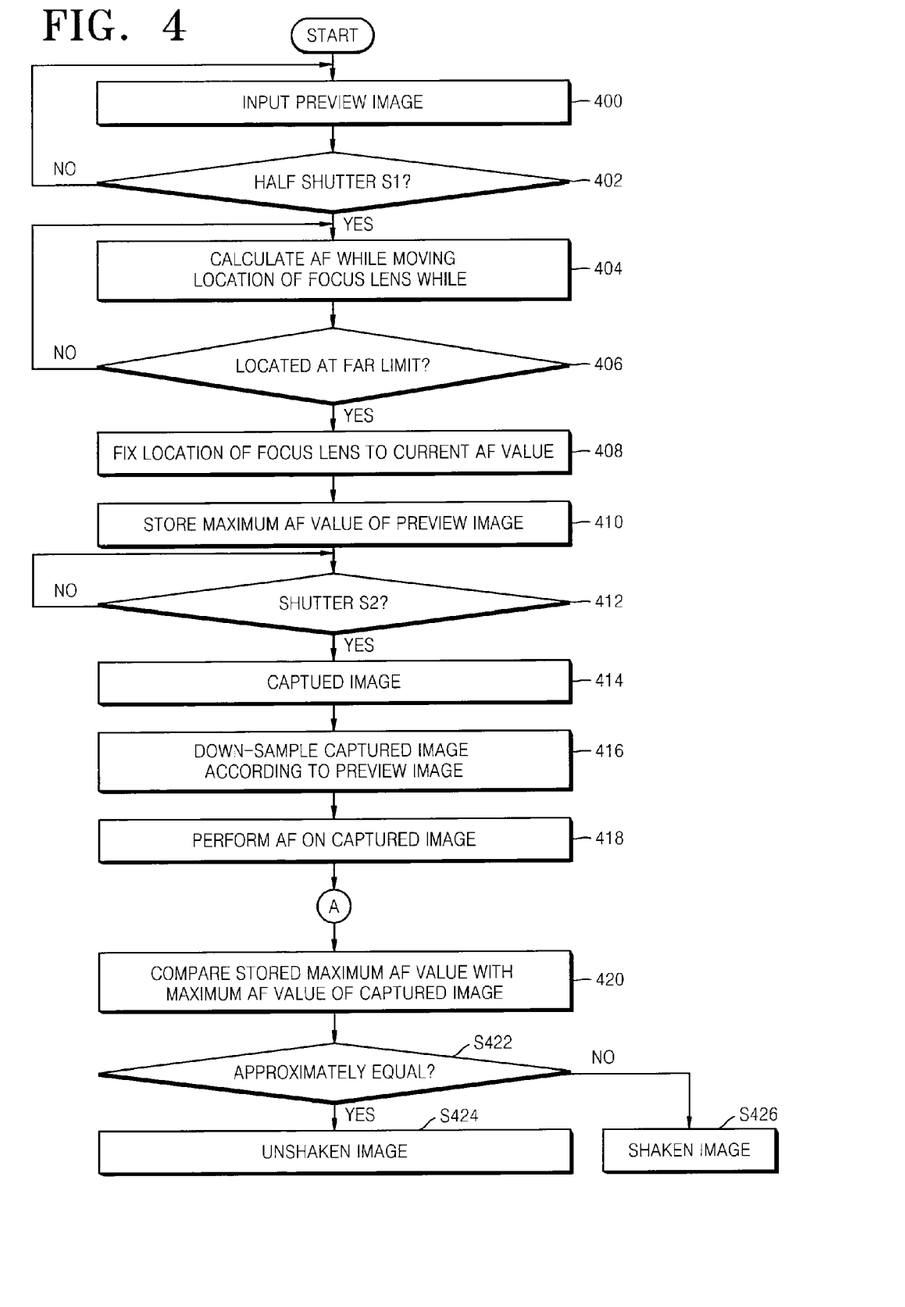
FIG. 4 is a flowchart illustrating another example of a method of determining whether an image is a shaken image using AF.

FIG. 4 is a flowchart illustrating an example of a method of determining a shaken image using AF.

Referring to FIG. 4, a preview image is input in operation 400. When the shutter button S1 is half pressed in operation 402, an AF value is calculated while moving the focus lens in operation 404. If the focus lens is located at a far limit in operation 406, the location of the focus lens is fixed at a location corresponding to the maximum AF value calculated in operation 404 to complete AF in operation 408.

In operation 410, the calculated maximum AF value of the preview image is stored.

When the shutter button is fully pressed in operation 412 (S2), an image to be input is captured in operation 414. In operation 416, the captured image is down-sampled according to the preview image. In operation 418, AF is performed on the down-sampled captured image to calculate the maximum AF value. In this case, the AF is performed by filtering the down-sampled captured image using a HPF and integrating the resultant.

In operation 420, the maximum AF value of the preview image stored in operation 410 is compared with the maximum AF value of the captured image stored in operation 418.

In operation 424, it is determined whether the image is not shaken if the maximum AF value of the preview image is approximately equal to the maximum AF value of the captured image in operation 422, and that the image is shaken if the maximum AF value of the preview image is not approximately equal to the maximum AF value of the captured image in operation 422.

In operation 426, the image determined as a shaken image may be conveniently deleted by displaying a message to inquire the user whether to delete the shaken. In addition, if the image is determined as a shaken image, an icon indicating that the image is shaken may be displayed with the image.

Figure 5:
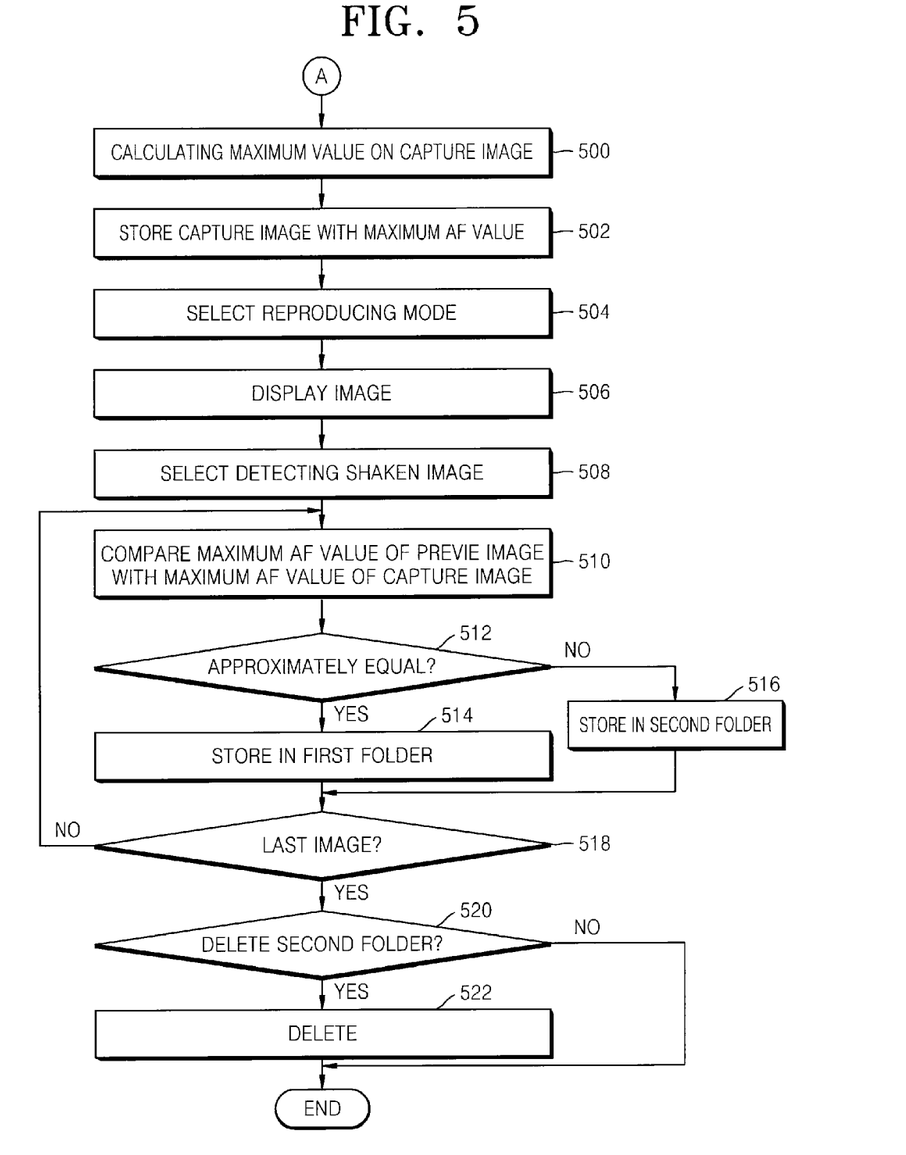
FIG. 5 is a flowchart illustrating an example of a method of determining whether an image is a shaken image using AF.

FIG. 5 is a flowchart illustrating another example of a method of determining a shaken image using AF.

Referring to FIG. 5, a maximum AF value of the captured image is calculated in operation 500, after performing operation 418. In this regard, the maximum AF value is obtained by filtering the down-sampled captured image using the HPF and integrating the result.

In operation 502, the captured image and the maximum AF value calculated in operation 500 are stored. The captured image is compressed, and the maximum AF value of the captured image is stored in EXIF to be recorded in a recording medium.

In operations 504 and 506, a reproducing mode is performed according to the selection of the user, and the image is displayed. In operation 508, a shaken image-detecting mode is performed according to the selection of the user.

The maximum AF value of the preview image stored in operation 510 and the maximum AF value of the captured image stored in operation 502 are extracted and compared with each other.

In operation 512, if the maximum AF value of the preview image and the maximum AF value of the captured image are approximately equal to each other, the captured image is stored in a first folder. If the maximum AF value of the preview image and the maximum AF value of the captured image are different from each other, the captured image is stored in a second folder. In this regard, unshaken images are stored in the first folder, and shaken images are stored in the second folder.

If the last image is stored in the recording medium in operation 518, it is determined whether to delete the second folder or not in operation 520. The images of the second folder are deleted according to the selection of the user in operation 522.

According to the method of determining a shaken image according to embodiments of the present invention, images stored in the recording medium may be simply classified into shaken images and unshaken images in the reproducing mode, and the shaken images may be simply deleted.

The above embodiments of the present invention are described with respect to a digital camera, which is an example of a photographing apparatus, but the embodiments also apply to a camera phone, a personal digital assistant (PDA), and a portable multimedia player (PMP), all of which include a camera.

According to the method of determining a shaken image according to embodiments of the present invention, shaken images may be determined using AF when photographing or reproducing images.

For convenience, in the description above, the functionality described has been divided into a number of units; however, the number of units may vary and the functionality described above may be differently divided among the units, or the functionality described above may be implemented without units. The various illustrative units described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. While the present invention has been particularly shown and described with reference to exemplary embodiments thereof, it will be understood by those of ordinary skill in the art that various changes in form and details may be made therein without departing from the spirit and scope of the present invention as defined by the following claims. The invention may also be embodied as computer readable codes on a computer readable recording medium. The computer readable recording medium is any data storage device that can store data which can be thereafter read by a computer system. The computer readable recording medium may be limited to physical data storage devices that can store data which can be thereafter read by a computer system.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of determining a shaken image using auto focusing (AF), the method comprising:
    calculating a first maximum AF value by performing AF on a preview image and storing the calculated AF value;
    sampling a captured image according to a resolution of the preview image;
    calculating a second maximum AF value by performing AF on the sampled captured image;
    comparing the stored first maximum AF value with the second maximum AF value; and
    determining whether the captured image is shaken or not based on a comparison result.

2. The method of claim 1, wherein the determining is performed by determining whether a difference between the first maximum AF value and the second maximum AF value is greater than a predetermined threshold value.

3. The method of claim 2, further comprising displaying a message if the captured image is a shaken image.

4. The method of claim 3, further comprising deleting the captured image according to a selection of a user, if the captured image is a shaken image.

5. The method of claim 2, further comprising storing the captured image in a first folder if the difference between the first maximum AF value and the second maximum AF value is smaller than the threshold value, and storing the captured image in a second folder if the difference between the first maximum AF value and the second maximum AF value is greater than the threshold value.

6. The method of claim 5, further comprising deleting the captured images stored in the second folder according to a selection of the user.

7. The method of claim 1, further comprising storing the calculated second maximum AF value within the captured image.

8. The method of claim 7, wherein the second maximum AF value is stored in an exchangeable image file (EXIF) of the captured image.

9. The method of claim 7, wherein it is determined whether the captured image is shaken or not by using the stored second maximum AF value when the captured image is reproduced.

10. The method of claim 9, wherein an icon indicating that the image is shaken is displayed while the captured image is reproduced.

11. A non-transitory computer-readable storage medium having a computer-readable program stored thereon that when executed by a computer perform a method comprising: calculating a first maximum AF value by performing AF on a preview image and storing the calculated AF value; sampling a captured image according to a resolution of the preview image; calculating a second maximum AF value by performing AF on the sampled captured image; comparing the stored first maximum AF value with the second maximum AF value; and determining whether the captured image is shaken or not based on a comparison result.

12. An apparatus for determining a shaken image, the apparatus comprising:
    an image signal processor sampling a captured image according to a resolution of a preview image;
    an auto focusing (AF) module calculating a first maximum AF value by performing AF on the preview and a second maximum AF value by performing AF on the sampled captured image; and
    a controller comparing the first maximum AF value with the second maximum AF value and determining whether the captured image is shaken or not based on a comparison result.

13. The apparatus of claim 12, further comprising a storage unit storing the first maximum AF value.

14. The apparatus of claim 12, wherein the controller determines whether the captured image is shaken if a difference between the first maximum AF value and the second maximum AF value is greater than a predetermined threshold value.

15. The apparatus of claim 14, wherein the controller outputs a signal if the captured image is shaken.

16. The apparatus of claim 15, wherein the controller deletes the captured image according to a selection of a user if the captured image is shaken.

17. The apparatus of claim 14, wherein the controller stores the captured image in a first folder if the difference between the first maximum AF value and the second maximum AF value is smaller than the threshold value, and stores the captured image in a second folder if the difference between the first maximum AF value and the second maximum AF value is greater than the threshold value.

18. The apparatus of claim 14, wherein the controller stores the calculated second maximum AF value within the captured image.

19. The apparatus of claim 18, wherein the controller stores the second maximum AF value in an exchangeable image file (EXIF) of the captured image.

20. The apparatus of claim 18, wherein the controller determines whether the captured image is shaken or not by using the stored second maximum AF value when the captured image is reproduced.

21. A method of determining whether an image is shaken using auto focusing (AF), the method comprising:
    calculating a first AF value of a preview image obtained at a focus lens location and storing the calculated first AF value;
    calculating a second AF value of a captured image obtained at the focus lens location;
    comparing the stored first AF value with the second AF value; and determining whether the captured image is shaken or not based on a comparison result.

22. The method of claim 21, where calculating a first AF value, comprises:
calculating a first AF value of a preview image obtained at a focus lens location and storing the calculated first AF value, wherein the focus lens location is determined by performing an auto focus process in response to receiving a user command; and wherein calculating a second AF value, comprises:
calculating a second AF value of a captured image obtained at the focus lens location, wherein the captured image was captured immediately after the auto focus process in response to receiving another user command.

23. The method of claim 21, where calculating a second AF value, comprises:
downsizing a captured image obtained at the focus lens location to a resolution of the preview image; and
calculating a second AF value of the captured image.

* * * * *